Aug. 14, 1962
B. E. AHLPORT
3,049,020
ROTARY REVERSING MECHANISM
Filed Aug. 10, 1959
3 Sheets-Sheet 1
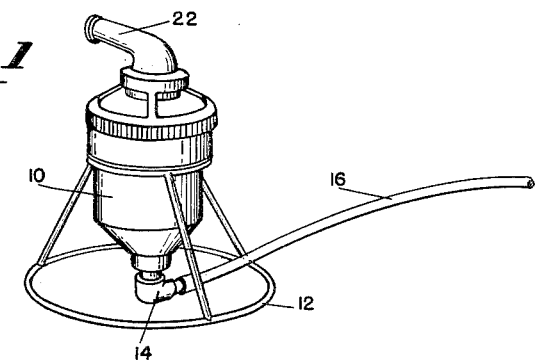
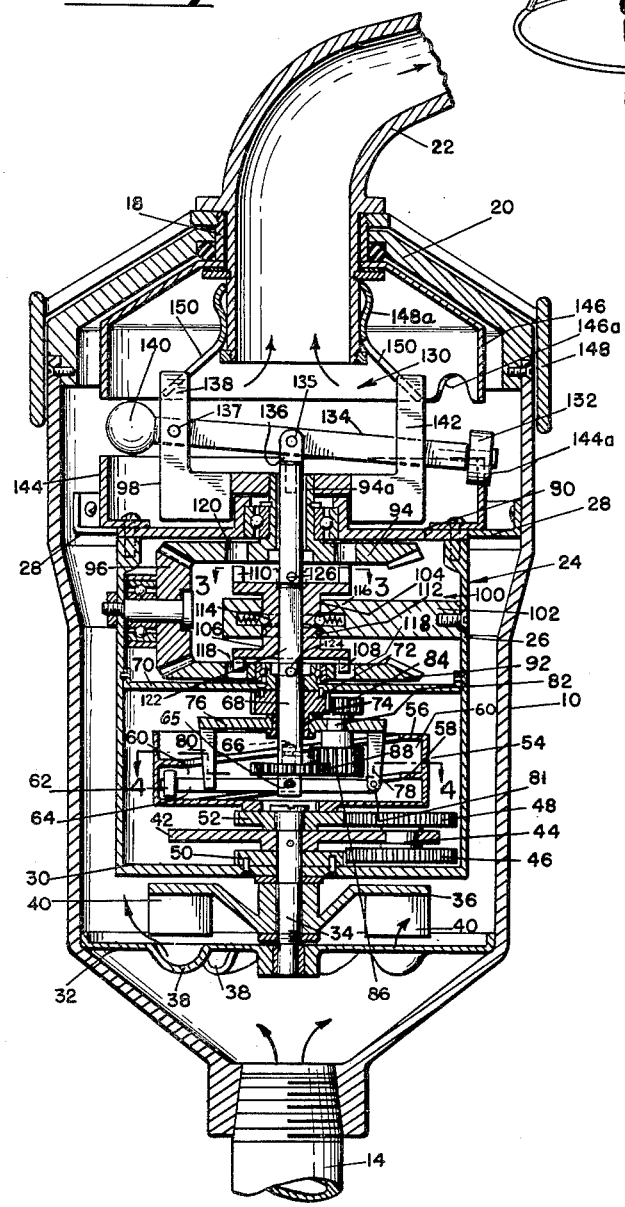
INVENTOR.
BRODIE E. AHLPORT
BY Forrest J. Lilly
ATTORNEYS

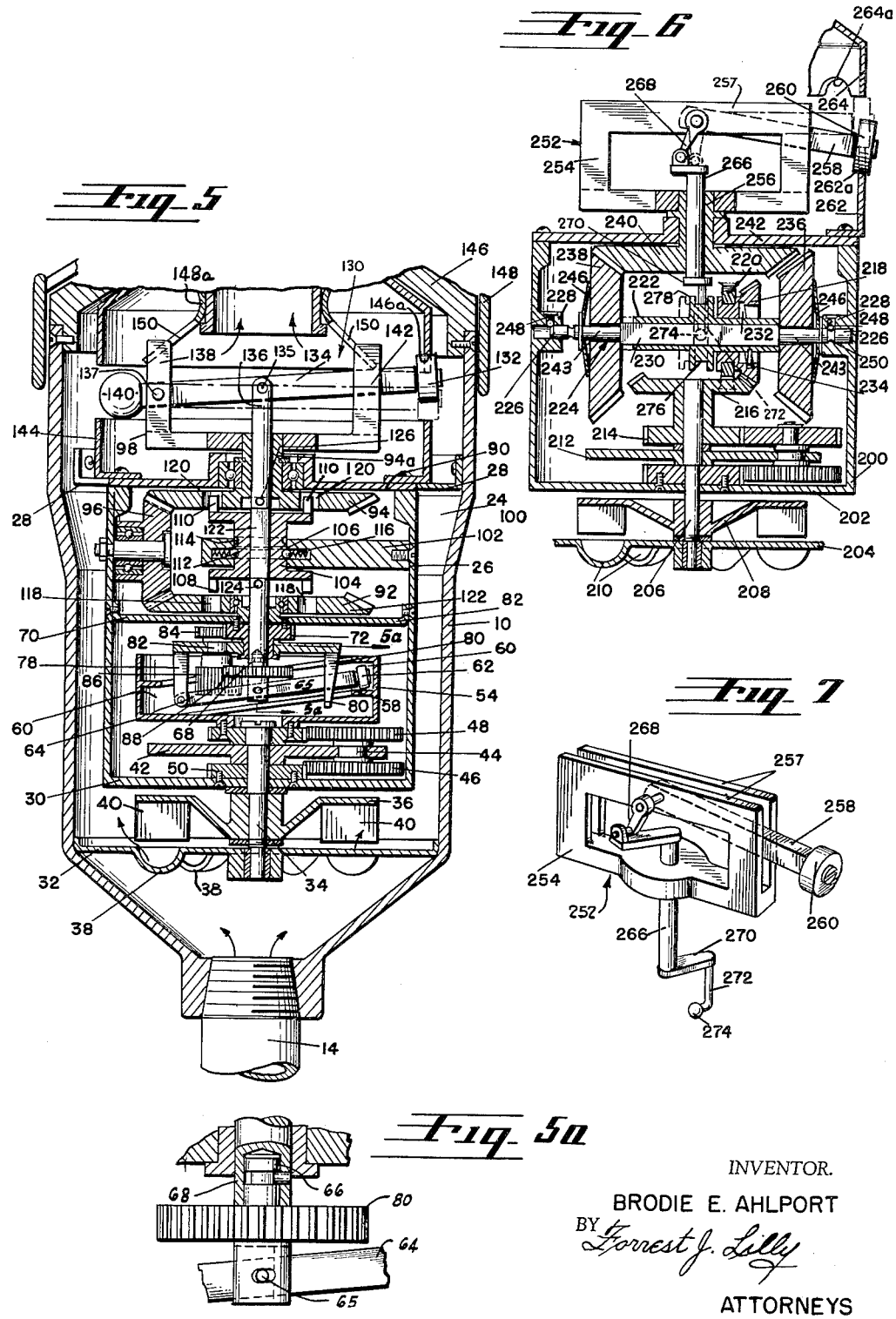

Aug. 14, 1962
B. E. AHLPORT
3,049,020
ROTARY REVERSING MECHANISM
Filed Aug. 10, 1959
3 Sheets-Sheet 3
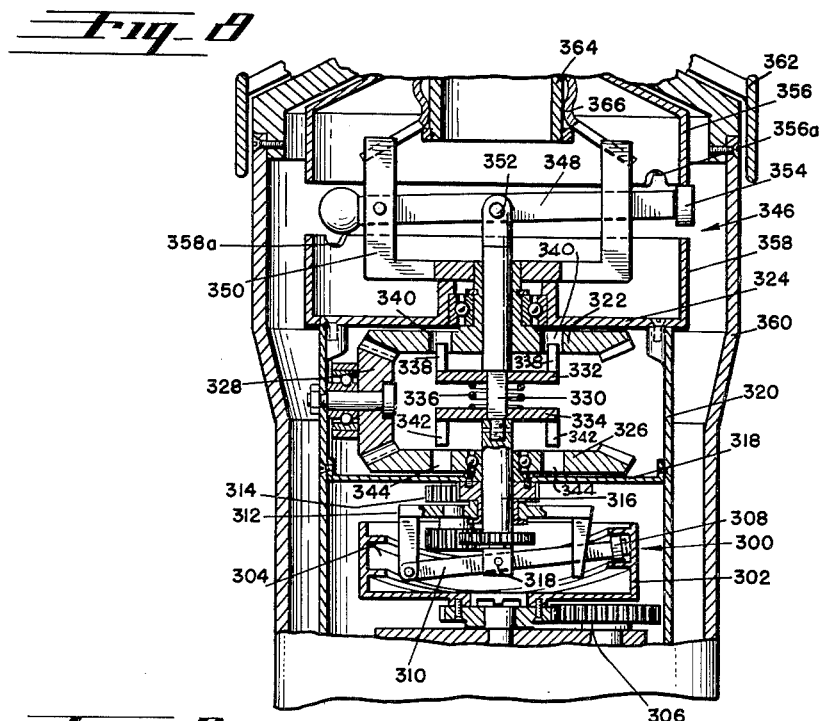
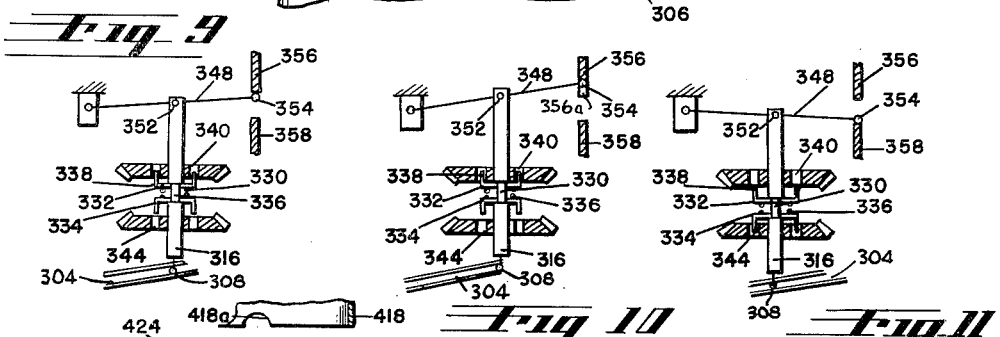
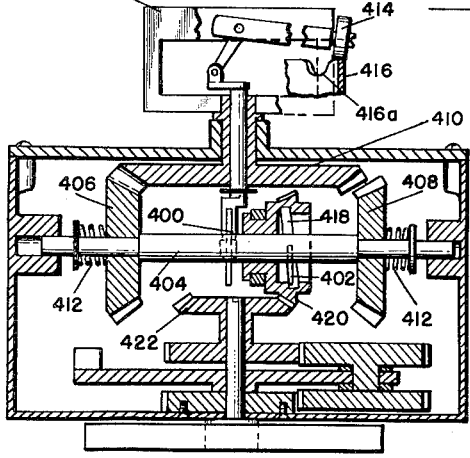
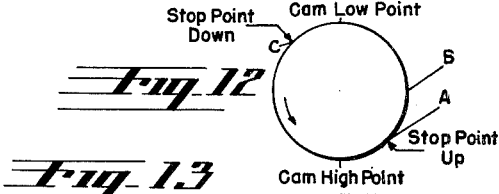
INVENTOR.
BRODIE E. AHLPORT
BY *Forrest J. Lilley*
ATTORNEYS United States Patent Office 3,049,020
Patented Aug. 14, 1962

3,049,020
ROTARY REVERSING MECHANISM
Brodie E. Ahlport, 905 Buena Vista,
South Pasadena, Calif.
Filed Aug. 10, 1959, Ser. No. 832,608
13 Claims. (Cl. 74—319)

This invention relates generally to rotation reversing mechanisms, and more particularly to a mechanism for effecting periodic reversal in the direction of rotation of a rotary driven element by a unidirectionally rotating driving element.

The reversing mechanism of this invention is related to the reversing mechanism disclosed in my Patent No. 2,874,584 issued February 24, 1959.

Briefly stated, the reversing mechanism of my aforementioned copending application consists of a pair of counter-rotating drivers, a rotary driven element, and cam control means for effecting alternate coupling of the driven element to the counter-rotating drivers, so as to cause a periodic reversal in the direction of rotation of the driven element. The cam control means of the mechanism comprises a pair of opposing concentric cams having arcuate notches in their opposing edges. Included in the mechanism is a pivotal cam follower arm mounting a cam roller. This cam follower arm is pivotally mounted on a support fixed to the final driven element of the mechanism and is rotatable about the common axis of the control cams.

During rotation of the support by the mechanism, the cam roller moves between the opposing edges of the cams and is normally prevented from swinging in either direction by such edges. Means are embodied in the mechanism for urging the cam roller against one of these cams during rotation of the driven element in one direction and against the other cam during rotation of the driven element in the opposite direction. Upon rotation of the cam roller into alignment with a notch in one or the other of the cams, depending upon the direction of rotation of the roller, the cam follower arm is released for swinging in a corresponding direction.

The reversing mechanism is operative in response to release of the cam follower arm for swinging in one direction or the other to reverse the direction of rotation of the driven element. The cam roller is thereby moved out of the aligned notch and against the opposing cam to condition the mechanism for continued rotation of the driven element in the reversed direction. The reversing means of the prior mechanism, which is controlled by the cam follower arm, comprises rotary escapement means alternately engageable with the counter-rotating drivers in response to movement of the cam roller into one or the other of the notches in the cams of the mechanism.

The reversing mechanism of the present invention is generally similar to that of my aforementioned copending application, in that it embodies a pair of counter-rotating drivers and cam controlled reversing mechanism for effecting alternate coupling of the driven element of the mechanism with these drivers. In the present mechanism, however, operative connection of the final driven element to the drivers is accomplished by an actual clutching action rather than by an escapement action, as in my prior mechanism.

The advantages of the present reversing mechanism are, however, generally the same as those set forth in the aforementioned copending application. Thus, most existing reversing mechanisms have dead-center points in their reversing cycles wherein the driving forces are balanced or zero. In order to assure continued operation of these existing mechanisms, it is necessary that the inertia of the parts be sufficient to carry the same through these dead-center points.

These existing mechanisms, therefore, have in their operating cycles, points at which the mechanism is subject to stalling. Moreover, if the mechanism, when shut down, comes to rest at a point of increased load or a dead-center point, manual shifting of the parts of the mechanism away from such point is generally necessary before the mechanism can be restarted.

Reversing mechanisms in which the load on the driver is substantially increased during the reversing cycles are, of course, disadvantageous or even useless in many applications. They are unsuited, for example, to applications in which the available driving torque or power is relatively small, such that a slight increase in load can stall the driver. The primary advantage of the present reversing mechanism is that the load on the driver of the mechanism is reduced during the reversing cycles. Further, there are no dead-center positions. Stalling of the mechanism, even though the applied power be small, is thereby substantially eliminated.

A broad object of the present invention is the provision of a new and improved rotary reversing mechanism of the character described.

A more specific object of the invention is the provision of a rotary reversing mechanism of the character described which is immune to stalling.

Another specific object of the invention is the provision of a rotary reversing mechanism of the character described wherein the load on the driver is reduced during the periodic reversing cycles.

Yet another object of the invention is the provision of a reversing mechanism of the character described wherein there are no dead-center points in the reversing cycle.

Still another object of the invention is the provision of a rotary reversing mechanism of the character described which is operative to reverse the direction of rotation of a rotary driven element at two points in its circular path and which mechanism is adjustable to vary the angular spacing between these reversal points so as to effect oscillation of the driven element through any desired arc.

A further object of the invention is the provision of a rotary reversing mechanism utilizing novel reversing action.

Yet a further object of the invention is the provision of a rotary reversing mechanism of the character described which is relatively simple in construction and operation, relatively immune to malfunctioning, capable of operating with a power source of low starting torque, and otherwise especially well suited to its intended purpose.

Briefly, these and other objects are attained by the provision of a rotary reversing mechanism equipped with a rotary driving shaft, a rotary, reciprocatory driven element, and a cam coupling between said shaft and element. When the driven element is axially restrained, the cam coupling acts to couple the driven element to the driving shaft for rotation with the latter.

When the driven element is released, the cam coupling acts to move the element in alternately opposite axial directions. The final driven member of the reversing mechanism is coupled to the driven element through reversing clutch means which are operated by axial movement of the element.

In one axial position of the element, the clutch means are set to cause rotation of the final driven member in one direction. In a second axial position of the driven element, the direction of rotation of the final driven member is reversed.

The driven member is periodically axially restrained and released to cause periodic reversal of the final driven member by an adjustable control cam means. This latter cam means can be adjusted to vary the arc of oscillation of the driven member.

A better understanding of the invention may be had in the following detailed description thereof, taken in connection with the annexed drawings, wherein:

FIG. 1 is a perspective view of a sprinkler embodying the present reversing mechanism;

FIG. 2 is an enlarged longitudinal section through the sprinkler of FIG. 1;

FIG. 3 is a section taken along line 3—3 of FIG. 2;

FIG. 4 is a section taken along line 4—4 of FIG. 2;

FIG. 5 is a partial view, similar to FIG. 2, illustrating the parts of the reversing mechanism in another position of operation;

FIG. 5a is an enlarged section taken along line 5a—5a of FIG. 5;

FIG. 6 is a longitudinal section through a modified form of the present reversing mechanism, parts of the sprinkler in which the mechanism is embodied being omitted for the sake of clarity;

FIG. 7 is an enlarged perspective view of a portion of the cam control means embodied in the modified sprinkler of FIG. 6;

FIG. 8 is a view similar to FIG. 5, illustrating a further modified form of the mechanism;

FIGS. 9 through 11 are diagrammatic views illustrating the reversing action of the mechanism of FIG. 8;

FIG. 12 illustrates certain features of the cam coupling means of the mechanism of FIG. 8; and FIG. 13 is a view similar to FIG. 6, and illustrating a slightly modified form of the mechanism.

Referring now to these drawings, and more particularly to FIGS. 1 through 5 thereof, illustrating one form of the present reversing mechanism embodied in an oscillatory sprinkler, the latter will be seen to be generally similar to the sprinkler disclosed in my aforementioned copending application. As described more fully in the latter application, the illustrative sprinkler comprises a stationary, generally cylindrical casing 10 supported on a stand 12. Connected to the lower end of the casing is a fitting 14 adapted to be attached to a hose 16 for conveying water under pressure to the sprinkler.

Journalled in a sleeve 18, rotatably supported in the upper wall 20 of the casing 10, is a nozzle 22. During operation of the sprinkler, a stream of water is discharged from the nozzle 22, the latter being oscillated through a predetermined arc to cause the stream of water to play back-and-forth over a selected area.

Nozzle 22 is thus oscillated by a reversing mechanism, generally indicated at 24, contained within the casing 10. This reversing mechanism comprises a supporting cage 26, fixed to the casing 10 by radially extending brackets 28. The cage 26 is spaced from the inner wall of the casing 10 so as to provide an annular passage through which water may flow from the inlet fitting 14 to the nozzle 22.

Journalled adjacent opposite ends in the lower wall 30 of the supporting cage 26 and in a plate 32 fixed in and extending across the lower end of the casing 10 is a shaft 34. Rigidly fixed on the shaft 34, between the wall 30 and plate 32, is an impeller 36.

Plate 32 is formed with a series of scoops 38 which direct water entering the casing 10 against the blades 40 of the impeller to rotate the latter in a clockwise direction, as viewed in FIG. 2.

Fixed to the upper end of the impeller shaft 34 is a radial arm 42. Journalled in one end of this arm 42, for rotation about an axis paralleling the shaft 34, is a shaft 44 mounting gears 46 and 48 at opposite ends. Gear 46 meshes with a gear 50 fixed to the lower cage wall 30, concentric with the shaft 34. Gear 48, on the other hand, meshes with a gear 52, journalled on the upper end of the shaft 34. Gears 50, 46 and 48 may, for example, have the same number of teeth, and gear 52 may have one less tooth. Other possibilities are obvious. The gearing, just described, comprises a reverted epicyclic gear train, of the type disclosed in my afortmentioned copending application. When arm 42 is rotated in a clockwise direction, by the action of water impinging the impeller 36, the upper gear 52 of the gear train is also rotated, but with great gear reduction.

Fixed to the upper gear 52, for rotation with the latter, is a cylindrical box cam 54. Box cam 54 comprises a generally cylindrical outer shell rigid on the inner wall of which are a pair of axially spaced annular flanges 56 and 58. As shown, flanges 56 and 58 are disposed in parallel planes inclined to the common axis of the box cam and shaft 34, and define therebetween a cam groove 60 which is similarly inclined to the latter axis.

Engaging in the cam groove 60 is a cam follower roller 62. Roller 62 is rotatably mounted on the outer end of a pivotal arm 64 pivotally connected intermediate its ends (as at 65, FIGS. 4 and 5a) on a horizontal axis in a vertical pin 66 concentrically journalled in the lower end of a driven shaft 68. Pin 66 is held against axial movement in the shaft 68 in any suitable manner.

Shaft 68 is slidably and rotatably journalled in a transverse wall 70 of the supporting cage 26, and in a gear 72 fixed to the underside of the latter wall 70 concentric with the impeller shaft 34. Shaft 68 is, therefore, capable of both rotation and axial movement relative to the supporting cage 26. As will appear presently, cam 54 and cam follower 62 form a releasable drive coupling between the driving shaft 34 and driven shaft 68.

Journalled on a reduced, shouldered extension 74 of the gear 72 is a radial arm 76. Rigid on opposite ends of the radial arm 76 are pairs of spaced, downwardly depending arms 78 and 80. Cam roller arm 64 is received between the pairs of arms 78 and 80, and has its right-hand end, as viewed in FIG. 2, pivotally connected to the depending arms 78, as indicated at 81 in FIG. 4. The left-hand end of the cam roller arm 64, as viewed in FIG. 2, is movably received between the depending arms 80.

From the description thus far of the reversing mechanism 24, it will be seen that if the driven shaft 68 is restrained against rotation but is free to move in an axial direction, rotation of the box cam 54 by turning of the impeller 36 under the action of water impinging its blades 40, results in relative movement of the cam roller 62 along the inclined cam groove 60. This relative movement of the cam roller along the cam groove imparts pivotal movement to the cam roller arm 64 about its pivotal connection to the depending arms 78. This pivoting of the cam roller arm 64, in turn, imparts reciprocatory motion to the driven shaft 68.

On the other hand, if the driven shaft 68 is restrained against axial movement, but is free to rotate, rotation of the box cam 54, by turning of the impeller 36, results in binding or wedging of the cam roller 62 in the cam groove 60. This binding action, in effect, locks the roller supporting arm 76 to the box cam 54 for rotation with the latter. Other cam and cam follower arrangements may be used for this purpose.

Journalled on the right-hand portion of the roller supporting arm 76, as viewed in FIG. 2, is a shaft 82. Fixed to the upper and lower ends of this shaft are a pair of gears 84 and 86, respectively. Gear 84 meshes with the aforementioned stationary gear 72, fixed to the cage wall 70. Gear 86, in turn, meshes with a pinion 88, rigid on the lower end of the driven shaft 68.

As shown in the drawings, gear 86 has a greater axial dimension than the pinion 88, so that the latter is capable of axial movement with the shaft 68, while remaining in mesh with the gear 86.

The gears 72 and 84 through 88 comprise a second reverted epicyclic gear train, generally similar to that described above. When the gears 84 and 86 are transported about the fixed gear 72 by turning of cam roller supporting arm 76, which occurs, as noted above, when shaft 68 is restrained against axial movement, so as to lock arm 76 to box cam 54, the driven shaft 68 is also rotated, but with great gear reduction.

Journalled in suitable bearings on the upper side of the intermediate cage wall 70 and on the underside of the upper wall 90 of the cage 24, concentric with the driven shaft 68, are a pair of bevel gears 92 and 94, respectively. These bevel gears mesh with a common pinion 96. As shown, pinion 96 is rotatably mounted on the side wall of the cage 24 for rotation about a transverse axis of the driven shaft 68.

Rigidly fixed to the upper end of a concentric collar 94a on the upper gear 94 is a second cam roller support 98. As shown in the drawings, the upper gear 94 and its collar 94a are axially bored and slidably journal the upper end of the driven shaft 68.

From the description of the reversing mechanism 24 thus far, it will be clear, assuming the driven shaft 68 to be locked to the cam 54 in the manner described above, that the driven shaft 68 is continuously rotated in the same direction. If the lower gear 92 is now locked to the driven shaft 68 for rotation with the latter, the upper gear 94, and, therefore, the cam roller support 98 are driven in one direction. On the other hand, if the lower gear 92 is assumed to be freely rotatable relative to the driven shaft 68 and the upper gear 94 to be fixed to the latter shaft, the latter gear and the upper cam roller support 98 are rotated in the opposite direction. It is seen, therefore, that the upper cam roller support 98 may be caused to rotate in one direction or the other by selectively locking the gears 92 and 94 to the driven shaft 68.

Generally indicated at 100 are clutch means, operated by axial movement of the driven shaft 68, for selectively locking the latter to the gears 92 and 94 in the manner just mentioned. Clutch means 100 comprise a transverse support 102 fixed to the inner wall of the supporting cage 26. Extending through the free end of this support 102, concentric with the driven shaft 68, is an enlarged bore 104. Slidably received in this bore 104 is a clutch collar 106 formed at opposite ends with axially extending clutch teeth 108 and 110.

The intermediate cylindrical portion of the clutch collar 106 is formed with a pair of axially spaced semicylindric grooves 112 and 114. Releasably receivable in the clutch collar grooves 112 and 114, so as to releasably retain the clutch collar in its lower position of FIG. 2 or its upper position of FIG. 5, are a series of spring pressed balls 116 carried on the transverse support 102.

In the aforementioned lower position of the clutch collar 106, the lower clutch teeth 108 thereon engage in axial openings 118 in the lower gear 92. In the upper position of the clutch collar 106, illustrated in FIG. 5, the upper clutch teeth 110 thereon engage in axial openings 120 in the upper gear 94. The portion 122 of the driven shaft 68 which extends through the clutch collar 106 is squared and slidably received in a square, axial opening through the clutch collar. The clutch collar is, therefore, slidably keyed to the driven shaft 68 for axial movement on and rotation with the latter.

From this description, it will be seen that with the driven shaft 68 rotating and the clutch collar 106 in its lower position of FIG. 2, the lower bevel gear 92 is locked to the shaft for rotation therewith. Rotation of the driven shaft 68, therefore, imparts rotation to the upper cam roller support 98 in one direction. Similarly, movement of the clutch collar 106 to its upper position of FIG. 5 locks the upper bevel gear 94 to the driven shaft 68. The upper cam roller support 98 is, therefore, driven in the other direction of rotation.

Movement of the clutch collar 106 to its upper and lower positions is accomplished by axial movement of the driven shaft 68. To this end, the latter shaft mounts a pair of projecting, transverse pins 124 and 126. These pins are engageable with opposite ends of the clutch collar to impart movement to the latter when the driven shaft 68 is shifted in an axial direction. As shown, the pins 124 and 126 are axially spaced a distance somewhat greater than the axial dimension of the clutch collar so as to provide, in effect, a lost motion connection between the driven shaft and clutch collar.

Referring now to FIG. 2, it will be observed that when the lower cam roller 62 is positioned in the lowermost point of the inclined cam groove 60, of the box cam 54, the driven shaft 68 occupies its lowermost axial position wherein the upper pin 126 engages the upper end of the clutch collar 106, and the latter is in its lower position of clutching engagement with the lower bevel gear 92. Similarly, when the lower cam roller 62 is rotated to the highest point of the cam groove 60, the driven shaft 68 is elevated to its upper limiting position wherein the lower pin 124 on the shaft engages the lower end of the clutch collar 106 and the latter is in its upper position (FIG. 5) of clutching engagement with the upper bevel gear 94. Clearly then, axial movement of the driven shaft 68 to shift the clutch collar 106 into alternate clutching engagement with gears 92 and 94 may be accomplished by movement of the lower cam roller along its cam groove 60, so as to alternately pass through the high point and low point of the groove.

The axial spacing between the driven shaft pins 124 and 126 is greater than the axial dimension of the clutch collar 106 by an amount which is approximately equal to one-half the total axial travel of the driven shaft 68 between its aforesaid upper and lower limiting positions. It will be clear, therefore, that rotation of the box cam 54, relative to the lower cam roller 62, through approximately 90° from its position of FIG. 2, results in upward axial shifting of the driven shaft 68 a distance equal to the spacing between the lower pin 124 on the shaft and the lower end of the clutch collar 106.

During this first quarter turn of the drum cam from its position of FIG. 2 to a position wherein the lower cam roller 62 is positioned at one-mid point of the cam groove 60, midway between the high and low points of the latter, the driven shaft 68 is moved upwardly to engage its lower pin 124 with the lower end of the clutch collar 106. The clutch collar, however, remains in its lower position of FIG. 2 in clutching engagement with the lower gear 92. During the next quarter turn of the drum cam 54, from the above position wherein the lower cam roller 62 is located at the aforesaid one mid-point of the cam groove 60 to a position wherein the cam roller 62 engages in the high point of the cam groove, the driven shaft 68 and clutch collar 106 are moved upwardly as a unit to a position (see FIG. 5) wherein the collar is clutched to the upper gear 94.

A similar, but reversed, lost motion action occurs during the next 180° of rotation of the drum cam 54. Thus, during the first quarter turn of the drum cam through this next 180°, relative movement of the cam roller 62 in its cam groove 60 is from the high point of the cam groove to the second mid-point of the latter, diametrically opposite the first-mentioned mid-point. During this quarter turn of the drum cam, shaft 68 is shifted downwardly from its upper limiting position (see FIG. 5) to an intermediate position wherein the upper pin 126 on the shaft just contacts the upper end of the clutch collar 106. The clutch collar, however, remains in its upper position of clutching engagement with the upper bevel gear 94. During the final quarter turn of the cam 54, back to its position of FIG. 2, the shaft 68 and the clutch collar 106 are shifted downwardly as a unit to their positions of FIG. 2.

From this description, it will be seen that during relative movement of the lower cam roller 62 in its cam groove 60 from one of the aforesaid mid-points of the groove to the other, the shaft 68 is moved from its center position to its upper limiting position, and back to its center position. During this travel of the shaft, the clutch collar 106 is moved from its lower position of clutching engagement with the lower gear 92 to its upper position of clutching engagement with the upper gear 94 to reverse the direction of rotation of the upper cam follower support 98. Similarly, during relative movement of the cam roller 62 in its cam groove 60, from the last-mentioned mid-point of the groove to the first mid-point, the shaft 68 is moved downwardly from its center position to its lower limiting position, and back to its center position. During this latter travel of the shaft, the clutch collar 106 is moved from its upper clutching position to its lower clutching position to again reverse direction of rotation of the support 98. This reversing action occurs in response to each relative movement of the lower cam roller 62 from one of the mid-points of its cam groove 60 to the other mid-point.

It will be apparent that due to inherent friction in the reversing mechanism, a certain drag force is exerted on the lower cam roller 62 tending to restrain the latter against rotation with the drum 54. The present reversing mechanism is so designed that this restraining force on the roller 62 is sufficient to hold the latter against rotation with the drum cam 54 when the driven shaft 68 is released for free axial movement. Accordingly, when the shaft 68 is released for such axial movement, the shaft will be reciprocated in the manner just described to effect movement of the clutch collar 106 to its clutching positions in alternate fashion. During operation of the present reversing mechanism, as will be presently more fully discussed, the shaft 68 is restrained against axial movement for a predetermined arc of rotation of the support 98 when the lower cam roller 62 is at the mid-points of its cam groove 60. Oscillation of the support 98 through a predetermined arc is thereby accomplished.

This alternate releasing and restraining of the driven shaft 68, to control the reversing action of the present reversing mechanism, is accomplished by cam control means, generally indicated at 130, similar to the cam control means disclosed in my aforementioned copending application. The control cam means 130 comprises a cam follower roller 132 journalled at one end of an arm 134. Arm 134 is pivoted intermediate its ends, as at 135, on a pin 136, concentrically journalled in the upper end of the driven shaft 68. Pin 136 is restrained against axial movement relative to the driven shaft 68 in any suitable manner.

The left-hand end of the cam roller arm 134, as viewed in FIG. 2, is pivotally mounted, as at 137, between a pair of upstanding arms 138 on the cam roller support 98. A counter-weight 140 may be fixed to the latter end of the cam roller arm 134, if desired.

The right-hand end of the cam roller arm 134 is slidably received between a second pair of upstanding arms 142 on the upper roller support 98. It will be seen, therefore, that the aforementioned axial shifting of the driven shaft 68 causes swinging of the cam roller arm 134 from its position of FIG. 2 to its solid line position in FIG. 5. Fixed to the upper wall 90 of the supporting cage 26 is a lower cylindrical cam 144 engageable by the cam roller 132. A second, upper cylindrical cam 146, concentric with the lower cam 144, is fixed to the lower end of the aforementioned bearing sleeve 18. Fixed to the upper end of this sleeve, and located externally of the sprinkler casing 10, is a cam adjusting ring 148. The upper cam 146 may, therefore, be turned relative to the lower cam 144 by turning of the ring 148 relative to the casing 10.

Formed in the opposing circular edges of the lower and upper cams 144 and 146 are arcuate notches 144a and 146a, respectively. These notches are dimensioned to nicely receive the cam roller 132. The spacing between the circular edges of the cams 144 and 146 is substantially equal to or slightly greater than the diameter of the cam roller 132, so that the latter may move between these cam edges during rotation of the upper roller support 98.

Frictionally fitted about the lower axial end of the nozzle 22 is a spring collar 148. This collar 148 is provided with a pair of downwardly extending, divergent arms 150 which engage between the upstanding arms 138 and 142 on the upper roller support 98. Collar 148 frictionally couples the roller support 98 to the nozzle 22 for rotation of the latter with the support. The collar is designed to slip relative to the nozzle should the latter be accidentally restrained against rotation so as to prevent damage to the reversing mechanism. If desired, of course, the nozzle may be rigidly coupled to the upper roller support 98.

The operation of the reversing mechanism just described is believed to be obvious from the foregoing description. Thus, water entering the casing 10 through the inlet fitting 14 flows through the scoop passages 38 and impinges the impeller blades 40. The impeller 36 is thereby rotated and drives the drum cam 54 through the lower epicyclic gear train 46 through 52.

Assuming the parts of the reversing mechanism to be in the positions of FIG. 2, wherein the lower cam roller 62 engages in the lower point of its cam groove 60, and the upper cam roller 132 engages in the notch 144a of the lower cylindric cam 144, the driven shaft 68 will be seen to be released for upward shifting from its position of FIG. 2. With the driven shaft 68 thus released, the lower cam roller 62 is restrained against rotation with the drum cam 54 by virtue of the aforementioned frictional restraining forces in the reversing mechanism. During the first 90° of rotation of the drum cam 54 from its position of FIG. 2, therefore, relative rotation occurs between the drum cam and the cam roller 62, during which the latter rides along the cam groove 60 toward the high point of the latter. During this relative movement of the cam follower roller 62 along its groove 60, the driven shaft 68 is shifted upwardly by the camming action between the cam roller 62 and drum cam. The clutch collar 106, of course, initially remains in its lower position, illustrated in FIG. 2, of clutching engagement with the lower bevel gear 92.

This upward shifting of the driven shaft 68 is limited by abutment of the upper control cam roller 132 with the edge of the upper cylindrical cam 146. In this limiting position of the driven shaft 68, the latter occupies its center position wherein the lower pin 124 on the shaft just engages the lower end of the clutch collar 106. The collar 106, therefore, remains in clutching engagement with the lower bevel gear 92. The control cam roller 132, at this time, is located in the axial space between the upper and lower cylindrical cams 144 and 146, so as to be capable of rotation relative thereto.

Since further upward axial movement of the driven shaft 68 is prevented, the aforementioned binding action occurs between the drum cam 54 and the cam roller 62, which is now located at one mid-point between the high point and low point of the cam groove 60. Rotation of the drum cam 54, therefore, imparts rotation to the cam roller 62 and its arm 64. The shaft 68 is, therefore, driven through the upper epicyclic gear train 72, 84 through 88. The upper cam roller support 98, in turn, is driven from the shaft 68 through the clutch collar 106, now engaged with the bevel gear 92, and the bevel gears 94 and 96.

The upper control cam roller 132 is carried around with the support 98 and is urged upwardly against the upper cylindrical cam 146 by virtue of the continued upward camming action between the lower cam roller 62 and drum cam 54. The roller support 98, upper cam roller 132 and nozzle 22 continue to rotate in this direction until the control cam roller 132 becomes aligned with the notch 146a in the upper cam 146. Upon registry of the cam roller 132 with notch 146a, the driven shaft 68 is released for further upward shifting to its upper limiting position of FIG. 5.

Due to this release of the driven shaft for upward movement, the binding action between the drum cam 54 and the cam roller 62 is terminated. The latter cam roller 62 is, therefore, again retained against rotation by the frictional restraining forces previously mentioned while the drum cam 54 continues to turn. Relative movement of the cam roller 62 along its cam groove 60 to the high point of the latter, therefore, occurs with resultant elevating of the driven shaft to its upper limiting position of FIG. 5. This latter upward shifting of the driven shaft, of course, results in upward movement of the clutch collar 106 out of engagement with the lower gear 92 and into engagement with the upper gear 94.

Continued rotation of the drum cam relative to the cam roller 62 beyond the position wherein the latter engages in the high point of its cam groove 60, results in a downward camming action on the roller. This downward camming action on the roller 62 causes downward shifting of the driven shaft 68 and the upper cam roller 132. The latter cam roller 132 is, thereby, moved out of the notch 146a in the upper cam 146.

This downward shifting of the driven shaft 68 is again limited by engagement of the upper cam roller 132 with the lower cylindrical cam 144. In this limiting position of the driven shaft 68, the latter occupies its center position wherein the upper pin 126 on the shaft just engages the upper end of the clutch collar 126. The clutch collar, therefore, remains engaged with the upper gear 94.

Upon downward shifting of the upper cam roller 132 into contact with the lower cylindrical cam 144 to limit downward travel of the driven shaft 68, the drum cam 54 will have turned relative to the cam roller 62, to a position wherein the latter is located at the second midpoint of its cam groove 60 midway between the high point and low point of the groove. Since further downward shifting of the driven shaft 68 is now prevented, the lower cam roller 62 is again locked to the drum cam 54 for rotation with the latter. Shaft 68 is, therefore, again driven.

Since the clutch collar 106 is now engaged directly with the upper gear 94, however, the upper cam roller support 98, the upper cam roller 132 and the nozzles 22 are rotated in the opposite direction of rotation. The upper cam roller 132 is now located in the axial space between the upper and lower cylindrical cams 144 and 146 so as to be capable of rotation relative to the latter. Also, the cam roller 132 is urged against the lower cam by virtue of the downward camming action exerted on the lower cam roller 62.

Rotation of the nozzle 22, upper roller support 98 and the upper cam roller 132 in this direction continues until the latter cam roller again becomes aligned with the notch 144a in the lower cylindrical cam 144. The driven shaft 68 is thereupon released for downward axial shifting.

The drum cam 54 now rotates relative to the lower cam roller 62, with the resultant downward camming of the roller and, therefore, the driven shaft 68. The upper cam roller 132, of course, moves into the notch 144a in the cam 144.

The clutch collar 106 is thereby moved out of clutching engagement with the upper gear 94 and into clutching engagement with the lower gear 92. Upon relative rotation of the drum cam 54 and cam roller 62 beyond the position of FIG. 2, wherein the latter engages in a low point of its cam groove 60, the roller and, therefore, the driven shaft 68 are again cammed upwardly. As before, however, the clutch collar remains in its lower position of engaging with the lower gear 92, because of the lost motion connection between the driven shaft and clutch collar. Upward shifting of the driven shaft is limited again by engagement of the upper cam roller 132 with the upper cylindrical cam 146. The direction of the nozzle 122, roller support 98 and the upper cam roller 132 are, therefore, again reversed to repeat the above-described cycle of operation.

FIGS. 6 and 7 illustrate a modified form of the present reversing mechanism. In FIG. 6, certain parts of the sprinkler, in which the illustrative reversing mechanism is embodied, such as the nozzle casing, have been omitted for clarity.

This modified reversing mechanism comprises a supporting cage 200 which is fixed within a sprinkler casing (not shown) in the same manner as the supporting cage 26 of FIG. 2. Journalled in the lower wall 202 of the cage 200 and a plate 204, corresponding to the plate 32 of FIG. 2, is a shaft 206. Fixed to this shaft 206 between the wall 202 and plate 204 is an impeller 208. This impeller is rotated in a clockwise direction, as viewed in FIG. 6, by the action of water flowing through scoops 210 in the plate 204 and impinging the blades of the impeller.

Generally designated at 212 is an epicyclic gear train, substantially identical to the lower epicyclic gear train 46 through 52 of FIG. 2. This gear train comprises a driven gear 214, corresponding to the gear 52 of FIG. 2, which is journalled on the shaft 206.

Integrally formed on the gear 214 is a bevel gear 216. Gear 216 meshes with a bevel pinion 218 journalled in a support 220 extending across and fixed at opposite ends to the supporting cage 200.

Bevelled pinion 218 has an axial bore slidably and rotatably receiving a sleeve 222 through which, in turn, extends a shaft 224. Shaft 224 comprises reduced cylindrical ends 226 slidably journalled in bosses 228 on the inner walls of the cage 200. Sleeve 222 is slidably keyed to the shaft 224 as by making the central portion 230 of the shaft and the axial opening through the sleeve 222 of squared cross-section.

Pinion 218 is formed with an internal cam groove 232 located in a plane inclined to the axis of the shaft 224. Rigid on the sleeve 222 and slidably engaging in this cam groove 232 is a cam follower pin 234. The cam groove 232 and cam follower pin 234 perform a function which is somewhat similar to that previously described with reference to the cam groove 60 and cam follower roller 62 in FIG. 2.

Thus, assuming the pinion 218 to be rotating, the shaft 224 to be restrained against rotation, and the sleeve 222 to be capable of free axial movement on the shaft 224, it will be clear that the cam groove 232 and cam follower pin 234 operate to impart reciprocatory motion to the sleeve 222. On the other hand, if the shaft 224 is freely rotatable and the sleeve 222 is restrained against axial movement on the shaft, the cam follower pin 234 binds or wedges in the cam groove 232, in the same manner as described with reference to the cam groove 60 and cam follower 62 of FIG. 2. The sleeve 222 is thereby, in effect, locked to the pinion 218 for rotation with the latter.

Non-rotatably mounted on opposite ends of the shaft 224, so as to be driven in rotation by the latter, are a pair of gears 236 and 238. These gears are adapted to be selectively meshed with a third gear 240, journalled in the upper wall 242 of the cage 200, by axial shifting of the shaft 224. In order to prevent jamming of the mechanism by improper meshing of these gears, the gears 236 and 238 are preferably loosely, though non-rotatably, mounted on reduced end portions 243 of the shaft 224 so as to be capable of limited rocking movement relative to the latter. The gears are resiliently retained in normal position against the annular shoulders at opposite ends of the central portion 230 of the shaft, by spring washers 246. Shaft 224 is releasably retained in its two extreme axial positions, wherein one or the other of the gears 236 or 238 meshes with the gear 240 by means of spring-pressed balls 248 in the bosses 228. These balls are engageable with the ends of and in annular grooves 250 in the cylindrical end portions 226 of the shaft 224.

During operation of the mechanism, axial movement of the shaft 224 to shift the gears 236 and 238 into and out of engagement with the gears 240 is accomplished by the camming action between the cam 232 and the cam follower pin 234. To this end, the length of the sleeve 222 is less than the axial spacing between the faces of the bevelled gears 236 and 238, in the normal illustrated positions of the latter, by an amount substantially equal to one-half of the total axial travel imparted to the sleeve 222 by the cam groove 232. Further, the axial spacing between the gears 236 and 238 is such that when one of these gears is meshed with the gear 240, the other gear is just out of mesh with the gear 240.

From this description, it will be clear that rotation of the pinion 218, relative to the sleeve 222, through approximately 90° from the position of FIG. 6, causes left-hand travel of the sleeve 22 into contact with the inner face of the left-hand bevelled gear 238. The cam follower 234 is then located at one mid-point of its groove 232 midway between the extreme left-hand and right-hand points of the groove. Continued rotation of the pinion 218 through 90° to a position wherein the cam follower pin 234 is located in the extreme left-hand point of the cam groove 232, imparts further left-hand movement to the sleeve 222 which is then engaged with the left-hand gear 238, as mentioned.

The shaft 224 is thereby moved to the left, as viewed in the drawings, from its right-hand limiting position of FIG. 6 to its left-hand limiting position wherein the right-hand gear 236 meshes with the gear 240 and the left-hand gear 238 is out of mesh with the gear 240. If now the pinion 218 continues to rotate relative to the sleeve 222, relative movement of the cam follower pin 234 in the cam groove 232 is toward the extreme right-hand point of the latter. The sleeve 222 is thereby cammed to the right, as viewed in FIG. 6. During rotation of the pinion 218 through approximately 90° to a position wherein the cam follower pin 234 is rotated to the second mid-point of its cam groove 232 midway between the extreme left-hand and right-hand points of the groove, the sleeve 222 is moved axially on the shaft 224 out of engagement with the left-hand gear 238 and into engagement with the right-hand gear 236. The shaft 224, however, remains stationary during this initial travel of the sleeve 222 so that the right-hand gear 236 remains in mesh with the gear 240. Continued rotation of the gear 218 back to the position of FIG. 6, wherein the cam follower 234 again engages in the extreme right-hand point of the cam groove 232, results in continued right-hand movement of the sleeve 222 which is then engaged, as just mentioned, with the right-hand gear 236. Shaft 224 is, therefore, shifted toward the right, as viewed in FIG. 6, from its left-hand limiting position to the right-hand limiting position illustrated. The right-hand gear 236 is thereby disengaged from the gear 240 and the left-hand gear 238 is reengaged with the gear 240.

Generally indicated at 252 are cam control means, similar to the cam control means 130 of FIG. 2, for releasably restraining the sleeve 222 against axial movement on the shaft 224 when the cam follower pin 234 is in one or the other of the aforesaid mid-points of its cam groove 232.

It will be clear from what has been said thus far that when the sleeve 222 is thus restrained against axial movement on the shaft 224, the latter is located in one of its extreme axial positions and is locked to the pinion 218 for rotation with the latter. Further, one or the other of the right and left-hand gears 236 and 238 are meshed with the gear 240. Since the gears 236 and 238 rotate with the shaft 224, the gear 240 is turned in one direction or the other, depending upon which of the gears 236 and 238 meshes with the gear 240. It will further be clear that if the sleeve 222 is released for axial movement, and the shaft 224 is restrained against rotation, the pinion 218 rotates relative to the sleeve and the latter is shifted axially on the shaft 224 to disengage the currently meshing gear 236 or 238 from the gear 240 and engage the latter with the other bevel gear 236 or 238. If the sleeve 222 is now again restrained against axial movement when the cam follower pin 234 is located in the following mid-point of its cam groove, the shaft 224 is again locked to the pinion 218 and the gear 240 is driven in the opposite direction of rotation.

The cam control means 252 comprises a support 254 fixed to the hub 256 of the upper gear 240 for rotation with the latter. As shown most clearly in FIG. 7, support 254 is of open, rectangular configuration and comprises a pair of spaced support sections 257. Pivotally mounted at one end between these support sections 257, for swinging about an axis normal to and intercepting the axis, extended, of the gear 240, is a cam follower arm 258. Journalled on the outer end of this arm is a cam follower roller 260.

Cam follower roller 260 is engageable with a pair of axially spaced, cylindrical cams 262 and 264. The cam roller and cam arrangement 260, 262, 264 is substantially identical to the cam roller and cam arrangement 132, 144 and 146 in FIG. 2, the upper cylindrical cam 264 being angularly adjustable relative to the lower cylindrical cam 262 in the same manner as described with reference to the upper cylindrical cam 146 in FIG. 2. Cams 262 and 264 are formed with arcuate notches 262a and 264a, respectively, for receiving the cam roller 260.

Journalled in an axial bore in the hub 256 of the upper gear 240 is a shaft 266. The upper end of the shaft 266 is connected to the pivoted end of the cam follower arm 258 by linkage means 268 illustrated most clearly in FIG. 7. Linkage means 268, which may assume various forms, is so arranged that turning of the shaft 266 in one direction imparts upward swinging movement to the cam follower arm 258, while turning of the shaft 266 in the opposite direction imparts downward swinging movement to the cam follower arm.

Rigidly fixed to the lower end of the shaft 266 is a radial arm 270. Rigid on the outer end of this arm is a depending shank 272, the lower end of which curves radially inwardly and terminates in a ball 274. This ball 274 is rotatably received in a peripheral groove 276, formed in a disc-like enlargement 278 at the center of the sleeve 222.

As shown most clearly in FIG. 6, the ball 274 engages in the peripheral groove 276 in a plane passing through the axis of the shaft 224 normal to the axis of the gear 240. From this description, it will be seen that axial movement of the sleeve 222 toward the left as viewed in FIG. 6, causes turning of the cam control shaft 266 in a counter-clockwise direction, as viewed in that figure, and upward swinging of the cam follower arm 258. Similarly, right-hand axial movement of the sleeve 222 causes turning of the cam control shaft 266 in a clockwise direction and downward swinging of the cam follower arm 258. As shown most clearly in FIG. 7, the cam follower arm 258 is guided in this swinging movement by the spaced sections 256 of the support 254.

Operation of the modified form of the present reversing mechanism is believed to be obvious from the foregoing description.

Thus, the impeller 208 is rotated by water flowing through the scoops 210 and impinging the blades of the impeller, as in the form of the invention illustrated in FIG. 2. This rotation of the impeller imparts rotation to the lower gear 216 through the epicyclic gear train 212. The pinion 218 is, thereby driven.

Assuming that the parts of the mechanism are in their positions of FIG. 2, wherein the left-hand gear 238 meshes with the gear 240 and the cam follower roller 260 engages in the notch 262a of the lower cylindrical cam 262, it will be seen that the cam follower arm 258 is free to swing upwardly to its phantom line position of FIG. 6. The cam control shaft 266 is thus free to turn in a counterclockwise direction so that the sleeve 222 is released for left-hand axial movement on the shaft 224.

Owing to the friction inherent in the mechanism, the gears 236 and 238 and the shaft 224 will tend to be restrained against rotation. With the sleeve 222 released, as just mentioned, for left-hand axial movement on the shaft 224, therefore, the pinion 218 rotates relative to the sleeve. Relative movement of the cam follower pin 234 in its cam groove 232 is now in a direction from the extreme right-hand point of the groove toward the extreme left-hand point of the latter.

A camming action is thereby exerted on the sleeve 222, tending to move the latter to the left and swing the cam control shaft 266 in a counterclockwise direction. Cam follower arm 258 is thereby pivoted upwardly. This upward swinging of the cam follower arm 258, and hence left-hand travel of the sleeve 222, is limited by engagement of the cam roller 260 with the upper cylindrical cam 264. The parts of the mechanism are so designed that approximately 90° of rotation of the pinion 218, from its position of FIG. 6, occurs during this upward swinging of the cam follower arm 258 from its solid line position of FIG. 6 to its phantom line, limiting position of that figure wherein the cam roller 260 engages the cam 264, as just mentioned.

Upon engagement of the cam roller 260 with the cam 264, therefore, the cam follower pin 234 will be located at one mid-point approximately midway between the extreme left-hand and right-hand points of the cam groove 232. During this initial quarter turn of the bevel pinion 218, therefore, the sleeve 222 is moved to the left a distance approximately equal to one-half of its total travel. The left-hand end of the sleeve, therefore, just abuts the inner face of the left-hand gear 238 which is presently meshed with the upper gear 240. Further left-hand movement of the sleeve 222 is now prevented by the aforementioned engagement of the cam roller 260 with the cam 264. Sleeve 222, and, therefore, shaft 224, are now locked to the pinion 218 for rotation with the latter, due to the aforedescribed binding of the cam follower pin 234 in the cam groove 232.

The right and left-hand gears 236 and 238 are driven with their shaft 224, the upper gear 240 meshing with the left-hand gear 238 so as to turn with the latter.

The cam roller support 254 and cam roller 260 carried thereon are thus rotated, the cam roller 260 moving in the axial space between the cylindrical cams 262 and 264. The nozzle (not shown) of the sprinkler, which is coupled to the support 254, rotates with the latter.

Upon rotation of the parts to a position wherein the cam roller 260 is aligned with notch 264a in the upper cylindrical cam 264, the cam follower arm 258 is released for upward swinging movement from its phantom line position of FIG. 6. The sleeve 222, which presently abuts the left-hand gear 238, is now released for continued left-hand movement.

Accordingly, relative rotation again occurs between the pinion 218 and the sleeve 222. During the first 90° of rotation of the pinion 218, relative movement of the cam follower pin 234 in its cam groove 232 is to the extreme left-hand point of the groove. During this quarter turn of the pinion, therefore, the sleeve 222 is moved toward the left, as viewed in FIG. 6. This results in movement of the shaft 224, and the bevel gears 236 and 238 thereon, to their left-hand limiting position, wherein the right-hand gear 236 engages the uper gear 240 and the left-hand gear 238 is disengaged from the upper gear.

Continued rotation of the pinion on the sleeve 222 results in relative movement of the cam follower pin 234 in its cam groove 232 toward the extreme right-hand point of the latter. A camming action is thereby exerted on the sleeve 222, tending to move the latter toward the right, as viewed in FIG. 6. This causes turning of the cam control shaft 266 in a clockwise direction and downward swinging of the cam follower arm 258. The cam roller 260 is thereby moved out of the notch 264a in the upper cylindrical cam 264, downward swinging of the arm being limited by engagement of the cam roller 260 with the lower cylindrical cam 262. In this limiting position of the cam follower arm 258, the cam follower pin 234 is located at the second mid-point of its cam groove 232 midway between the extreme left-hand and right-hand points of the groove. Also, the sleeve 222 just contacts the right-hand gear 236 which now meshes with the upper gear 240, as just mentioned. Since further right-hand travel of the sleeve 222 is prevented by engagement of the cam roller 260 with the cam 262, shaft 224 again becomes locked to the pinion 218 for rotation with the latter. The gears 236 and 238 are thereby again driven, the upper gear 240 now rotating in the opposite direction, owing to its meshing with the right-hand gear 236. The cam roller support 254 and the nozzle (not shown) coupled thereto are also rotated.

The cam roller 260 again rotates in the axial space between the cylindrical cams 262 and 264.

Rotation of the parts in this direction continues until the cam roller 260 again becomes aligned with the notch 262a in the lower cam 262. The cam follower arm 258 is thereby released for downward swinging movement from its phantom line position of FIG. 6. The sleeve 222 is then released for movement to its right-hand limiting position to disengage the right-hand gear 236 from the upper gear 240 and reengage the latter with the left-hand gear 238. The camming action on the sleeve 222 is then reversed, the sleeve being cammed to the left, as viewed in FIG. 6, with resultant upward swinging of the cam follower arm 258 until the cam roller 260 thereon engages the upper cam 264. The mechanism is now conditioned for again driving the cam roller support 254 and the nozzle (not shown) coupled thereto and repetition of the operating cycle just mentioned.

In each of the forms of the invention illustrated, the upper cylindrical cam 146 in FIG. 2 and 264 in FIG. 6 may be angularly adjusted relative to the lower cam 144 in FIG. 2 and 262 in FIG. 6 to vary the angular displacement between the notches in the two cams. This adjustment of the upper cam, of course, has the effect of varying the angle of oscillation of the final driven element or nozzle of the mechanism.

FIGS. 8 through 13 illustrate modified forms of the present reversing mechanism which are generally similar to the mechanisms of FIGS. 2 and 6, respectively. In the modified mechanisms of FIGS. 8 through 13, however, the lost motion action which was incorporated in the reversing means itself in the mechanisms of FIGS. 2 and 6, is embodied in the cam control means.

Referring first to FIGS. 8 through 12 illustrating a modified mechanism generally similar to the reversing mechanism of FIG. 2, the numeral 300 designates cylindrical box cam means identical to the cylindrical box cam means of FIG. 2. Thus, the box cam 300 comprises a cylindrical casing 302 formed with an inclined, annular cam groove 304. Casing 302 is rotated from an impeller (not shown) through epicyclic gearing partially illustrated at 306. Slidably engaging in the cam groove 304 is a cam roller 308 journalled on one end of an arm 310.

Arm 310 is pivoted at one end to a support 312 journalled, in the same manner as the support 76 in FIG. 2, on a fixed gear of an epicyclic gear train 314. This gear train connects the support 312 and a shaft 316 for rotation of the latter by rotation of the support 312 as in the reversing mechanism of FIG. 2. Arm 310 is pivotally connected at an intermediate point, to a pin 318 journalled in the lower end of the shaft 316.

As in the mechanism of FIG. 2, shaft 316 in FIG. 8 is journalled in a transverse wall 318 within the supporting cage 320 of the mechanism, and in the hub of an upper bevel gear 322. Upper gear 322, in turn is rotatably supported on the upper wall 324 of the supporting cage 320.

Journalled on the upper side of the transverse cage wall 318, concentric with the shaft 316, is a lower bevel gear 326. Bevel gears 322 and 326 mesh with a bevel pinion 328 journalled on the cylindrical wall of the cage 320. Slidably and non-rotatably mounted on a reduced intermediate portion 330 of the shaft 316 are a pair of upper and lower clutch elements 332 and 334, respectively. A coil compression spring 336, abutting at opposite ends the clutch elements 332 and 334, biases the latter against the shoulders at opposite ends of the reduced shaft portion 330.

The upper clutch element 332 is formed with clutch teeth 338 engageable in openings 340 in the upper gear 322. Similarly, the lower clutch element 334 is formed with clutch teeth 342 engageable in openings 344 in the lower gear 326.

The box cam means 300 operates in the same manner as the box cam means of FIG. 2, to impart axial, reciprocatory motion to the shaft 316 when the latter is released for free axial movement while being restrained against rotation with the casing 302 of the box cam. Further, when the shaft 316 is restrained against axial movement, the cam roller 308 binds or wedges in its cam groove 304 and the shaft 316, in effect, becomes locked to the casing 302 of the box cam for rotation with the latter.

Generally indicated at 346 are cam control means, generally similar to the cam control means 130 of FIG. 2, for intermittently restraining the shaft 316 against and releasing the shaft for axial movement for effecting periodic reversing actions of the mechanism. The cam control means 346 comprises a cam follower arm 348 pivoted at one end to a rotatable support 350 fixed to the upper bevelled gear 322. Arm 348, intermediate its ends, is pivotally connected to a pin 352, journalled in the upper end of the shaft 316. Journalled on the opposite end of the follower arm 348 is a cam follower roller 354. The cam roller 354 is rotatable between and engageable with a pair of cylindrical control cams 356 and 358. Formed in the opposing circular edges of these cams are a pair of arcuate notches 356a and 358a.

As in the reversing mechanism of FIG. 2, the lower control cam 358 is fixed against rotation to the supporting cage 320. The upper control cam 356, on the other hand, is rotatably supported on the casing 360 of the sprinkler in which the illustrative mechanism is embodied so as to permit adjustment of the angular spacing between the notches 356a and 358a in the control cams 356 and 358. Such angular adjustment of the upper control cam 356 is accomplished by turning of an external cam adjusting ring 362. The arc of oscillation of the nozzle 364 of the sprinkler may thereby be adjusted. This nozzle 364 is drivably connected to the rotatable support 350 by a slip clutch device 366.

As previously mentioned, the lost motion action necessary to reversing operation of the mechanism, which action was embodied in the reversing means itself in the mechanism of FIG. 2, is, in the mechanism of FIG. 8, effected in the control cam means 346. To this end, the cam roller 354 is somewhat smaller in diameter than the upper and lower control cams 356 and 358, as will readily be observed in FIG. 8, as well as in FIGS. 9 through 11.

Operation of the modified mechanism of FIG. 8 is as follows. Assuming the parts of the mechanism to be in the position of FIG. 8, wherein the cam roller 354 engages the edge of the upper control cam 356, the shaft 316 is in its upper, intermediate driving position shown. In this driving position of shaft 316, the upper clutch element 332 is clutched to the upper gear 322, while the lower clutch element 334 is disengaged from the lower gear 326, as will be seen in FIGS. 8 and 9.

At this time, the lower cam roller 308 occupies the position designated as A, in FIG. 12, midway between the high point of the cam groove 304 and that midpoint B of the cam groove which is spaced at 90 degrees from the high point in the direction in which the box cam 302 turns. It will be seen, therefore, that the camming action between the cam groove 304 and cam roller 308 is in a direction to shift the shaft 316 upwardly. As just mentioned, however, such upward shifting of the shaft is prevented by engagement of the cam control roller 354 with the upper control cam 356. Shaft 316, therefore, is locked to the box cam 302, for rotation with the latter by virtue of the binding action between the cam roller 308 and its cam groove 304. The upper cam roller support 350, and therefore the nozzle 364, are driven from the shaft 316 through the upper clutch element 332 presently engaged with the upper gear 322.

Rotation of the parts in this direction continues until the control cam roller 354 becomes aligned with the notch 356a in the upper control cam 356. The shaft 316 is thereby released for upward axial movement. Owing to the frictional restraining forces tending to restrain the shaft 316 against rotation, the latter and the lower cam roller 308 remain stationary. The box cam 302 now rotates relative to the cam roller 308.

Shaft 316 is thereby cammed upwardly to its upper limiting position, illustrated in FIG. 10, wherein the cam control roller 354 engages in the notch 356a of the upper control cam 356. The axial length of the teeth 338 on the upper clutch element 332 is such as to accommodate this upward travel of the shaft 316 from its upper, intermediate driving position of FIGS. 8 and 9 to its upper limiting position of FIG. 10, as will be readily observed in the drawings.

Upon rotation of the box cam 302 relative to the cam roller 308 to a position wherein the latter engages in the high point of its cam groove 304, the camming action on the shaft 316 is reversed and the latter is cammed downwardly. This results in movement of the cam control roller 354 out of the cam notch 356a. Downward travel of the shaft 316 is limited to its lower intermediate driving position of FIG. 11, by engagement of the control cam roller 354 with the circular edge of the lower control cam 358. In this lower, intermediate driving position of the shaft 316, the upper clutch element 332 is disengaged from the upper gear 322, while the lower clutch element 334 is clutched to the lower gear 326.

Since further downward shifting of the shaft 316 is now prevented, the lower cam roller 308 again binds in its cam groove 304. Shaft 316 is thereby locked to the box cam 302 for rotation with the latter. At this time, the cam roller 308 occupies a position C (FIG. 12) in its cam groove 304 diametrically opposite position A.

Rotation of the parts in this direction continues until the control cam roller 354 becomes aligned with the notch 358a in the lower control cam 358. The cam follower arm 348 is thereby released for downward swinging movement in the shaft 316 for downward shifting to its lower limiting position. The box cam 302, therefore, again rotates relative to the cam roller 308 until the latter is again located at position A (FIG. 12) in its cam groove 304, and the above cycle of operation is repeated.

In this form of the mechanism, as mentioned above, the control cam roller 354 is somewhat smaller in diameter than the axial spacing between the cylindrical control cams 356 and 358. A lost motion action, therefore, in effect, occurs between the control cam roller 354 and the control cams 356 and 358. That is, the control cam roller 354 is capable of axial movement between the two control cams to shift the two clutch elements 332 and 334 into and out of meshing engagement with their respective bevel gears. In the previous form of the mechanism, of course, the lost motion action occurred between the clutch collar 106 and the shaft 68.

Similarly, FIG. 13 illustrates a modified version of the reversing mechanism of FIG. 6, and wherein the lost motion action described with reference to FIG. 6 occurs, in the mechanism of FIG. 13, in the control cam means as just discussed with reference to FIG. 8.

Thus, the mechanism of FIG. 13 will be seen to be substantially identical to that of FIG. 6, except for the fact that the control cam arm-actuating collar 400, corresponding to the collar 278 in FIG. 6, as well as the cam follower pin 402, corresponding to the pin 234 in FIG. 6, are rigid on the driven shaft 404, rather than being formed on the sleeve which is slidably keyed to the shaft, as in the mechanism of FIG. 6. Also, the two driving gears 406 and 408, which are adapted to mesh alternately with the driven gear 410, are biased against annular shoulders on the shaft 404 by coil compression springs 412 which accommodate axial movement of the driving gears 406 and 408 on the shaft. Finally, the control cam roller 414 is, as in the case of the mechanism of FIG. 8, somewhat smaller in diameter than the axial spacing between the cylindrical control cams 416 and 418. The mechanism of FIG. 13 is otherwise identical to that of FIG. 6.

Operation of the modified mechanism of FIG. 13 is as follows. In the positions of the parts illustrated, the control cam roller 414 engages the lower control cam 416 to restrain the shaft 404 against left-hand movement. The cam follower pin 402, therefore, binds in the internal cam groove 418 of gear 420, identical to the cam groove 232 and bevel gear 218 of FIG. 6. This bevel gear 420 is driven from a bevel gear 422 which, in turn, is rotated from an impeller, as in the mechanism of FIG. 6.

Shaft 404 is now locked to the gear 420 for rotation with the latter. Bevel gear 410 and the upper roller support 424 are thus driven from the shaft 404 through the gear 406 which now meshes with the gear 410.

Rotation of the parts in this direction continues until the cam control roller 414 becomes aligned with the notch 416a in the lower control cam 416. Shaft 404 is now released for left-hand movement under the left-hand camming action of the pin 402 in its groove 418. During this left-hand movement of the shaft 404, the control cam roller 414 moves into the notch 416a in the lower control cam 416. The right-hand gear biasing spring 412 compresses to accommodate left-hand movement of the shaft 404, beyond the position wherein gear 408 is engaged with the gear 410.

Upon relative movement of pin 402 past the extreme left-hand point of its cam groove 418, the shaft 404 is shifted to the right. The control cam roller 414 is thereby moved out of the notch 416a in the lower control cam 416 and toward the upper control cam 418. Right-hand movement of the shaft 404 is limited by engagement of the roller with the upper control cam. In this limiting position of the shaft, the left-hand gear 406 is engaged with the gear 410, and the latter is disengaged from the gear 408. Shaft 404 now again becomes locked to the box cam gear 420 for rotation with the latter to turn the support 424 in the opposite direction. Upon rotation of the parts in this direction to align the control cam roller 414 with the notch 418a in the upper control cam 418, the shaft 404 is released for further right-hand movement to repeat the cycle of operation.

It will be apparent, therefore, that here again the operation of the mechanism is substantially identical to that of FIG. 6, except for the fact that the lost motion action is embodied in the control cam means rather than in the reversing means as in the latter mechanism.

It will, of course, be obvious that while the present mechanism has been shown as embodied in an oscillatory sprinkler, the invention is susceptible of numerous other applications and should, therefore, not be construed as limited to use in a sprinkler.

It will be clear, therefore, that prime movers other than an impeller may be used to drive the mechanism. If desired, the lower epicyclic gear train of the mechanism may be eliminated, and the drive coupling cam may be provided with more than one high point and one low point. Also, it may be desirable to fill the inner support or cage of the mechanism with a light machine oil.

While certain preferred embodiments of the invention have been described and illustrated, numerous modifications in designs, instrumentalities, and arrangement of parts, within the scope of the following claims, will be immediately apparent to those skilled in the art.

I claim:
1. A rotary reversing mechanism comprising a unidirectional rotary driving shaft, a rotary, axially movable driven shaft, a coupling between said shafts which drivably couples said shafts for unidirectional rotation of said driven shaft by said driving shaft when said driven shaft is restrained against axial movement and which restrainably reciprocates said driven shaft when said driven shaft is released for free axial movement, a reversible rotary driven member, a rotary reversing clutch mechanism including a reversible rotary driven clutch means connected to said driven member for rotation of the latter by said driven clutch means, rotary driving clutch means mounted on said driven shaft for rotation with the latter and axially movable with the driven shaft between a first position of driving engagement with said driven clutch means wherein said driven member is driven in one direction of rotation by said driven clutch means and a second position of driving engagement with said driven clutch means wherein said driven member is driven in the opposite direction of rotation by said driven clutch means, and means for restraining said driven shaft against axial movement with said driving clutch means in either of said positions to cause rotation of said driven member through a given arc and releasing said driven shaft for axial movement to shift said driving clutch means to the other of said positions at the ends of said arc, whereby to cause said driven member to oscillate through said arc.

2. The subject matter of claim 1 wherein said driven shaft restraining means comprises stationary cylindrical cam means, a cam follower connected to said driven member for rotation with the latter and along said cam means, and a connection between said cam follower and said driven member.

3. A rotary reversing mechanism comprising a unidirectional rotary driving shaft, a rotary, axially movable driven shaft, a coupling between said shafts including cooperating cam and cam follower means on said shafts, respectively, which drivably couples said shafts for unidirectional rotation of said driven shaft by said driving shaft when said driven shaft is restrained against axial movement and which restrainably reciprocates said driven shaft when said driven shaft is released for free axial movement, a reversible rotary driven member, a rotary reversing clutch mechanism including a reversible rotary driven clutch means connected to said driven member for rotation of the latter by said driven clutch means, rotary driving clutch means mounted on said driven shaft for rotation with the latter and axially movable with the driven shaft between a first position of driving engagement with said driven clutch means wherein said driven member is driven in one direction of rotation by said driven clutch means and a second position of driving engagement with said driven clutch means wherein said driven member is driven in the opposite direction of rotation by said driven clutch means, and means for restraining said driven shaft against axial movement with said driving clutch means in either of said positions to cause rotation of said driven member through a given arc and releasing said driven shaft for axial movement to shift said driving clutch means to the other of said positions at the ends of said arc, whereby to cause said driven member to oscillate through said arc.

4. A rotary reversing mechanism comprising a unidirectional rotary driving shaft, a rotary, axially movable driven shaft, a coupling between said shafts which drivably couples said shafts for unidirectional rotation of said driven shaft by said driving shaft when said driven shaft is restrained against axial movement and which restrainably reciprocates said driven shaft when said driven shaft is released for free axial movement, said coupling including a circular cam drivably coupled to one shaft for rotation therewith on the axis of rotation of said driven shaft and having a circular cam track in a plane inclined to said axis and a cam follower drivably coupled to the other shaft for rotation therewith and engaging in said cam track, a reversible rotary driven member, a rotary reversing clutch mechanism including a reversible rotary driven clutch means connected to said driven member for rotation of the latter by said driven clutch means, rotary driving clutch means mounted on said driven shaft for rotation with the latter and axially movable with the driven shaft between a first position of driving engagement with said driven clutch means wherein said driven member is driven in one direction of rotation by said driven clutch means and a second position of driving engagement with said driven clutch means wherein said driven member is driven in the opposite direction of rotation by said driven clutch means, and means for restraining said driven shaft against axial movement with said driving clutch means in either of said positions to cause rotation of said driven member through a given arc and releasing said driven shaft for axial movement to shift said driving clutch means to the other of said positions at the ends of said arc, whereby to cause said driven member to oscillate through said arc.

5. A rotary reversing mechanism comprising a rotary driving shaft, a rotary, axially movable driven shaft, a coupling between said shafts including a cam mounted for rotation on the axis of rotation of said driven shaft and having a circular cam track centered on and disposed in a plane inclined to said axis, means drivably coupling one of said shafts and said cam for rotation of the latter with said one shaft, said coupling further including a cam follower mounted for rotation on said axis and engaging in said cam track, means drivably coupling said cam follower and other shaft for rotation of the latter with said cam follower, said cam and cam follower forming a rotary drive connection between said driving and driven shafts when said driven shaft is restrained against axial movement and said cam and cam follower imparting restrainable axial reciprocation to said driven shaft when said driven shaft is released for free axial movement, a reversible rotary driven member, a rotary reversing clutch mechanism including a reversible rotary driven clutch means connected to said driven member for rotation of the latter by said driven clutch means, rotary driving clutch means mounted on said driven shaft for rotation with the latter and axially movable with the driven shaft between a first position of driving engagement with said driven clutch means wherein said driven member is driven in one direction of rotation by said driven clutch means and a second position of driving engagement with said driven clutch means wherein said driven member is driven in the opposite direction of rotation by said driven clutch means, and means for restraining said driven shaft against axial movement with said driving clutch means in either of said positions to cause rotation of said driven member through a given arc and releasing said driven shaft for axial movement to shift said driving clutch means to the other of said positions at the ends of said arc, whereby to cause said driven member to oscillate through said arc.

6. The subject matter of claim 5 wherein said cam is drivably coupled to said driving shaft for rotation by the latter and said cam follower is drivably coupled to said driven shaft for driving the latter in rotation.

7. The subject matter of claim 5 wherein said cam is a hollow cylindrical cam drivably coupled to said driving shaft and said cam track is formed internally of the cam, said driven shaft extends axially through said cam, and said cam follower is mounted on said driven shaft within said cam.

8. A rotary reversing mechanism comprising a rotary driving shaft, a rotary driven shaft which is axially movable from a normal centered position in one direction to a first limiting position and in the opposite direction to a second limiting position, a reversible rotary driven member, a rotary reversing clutch mechanism including rotary reversible driven clutch means connected to said driven member for rotation of the latter by said driven clutch means, a driving clutch means mounted on said driven shaft for rotation with and limited axial movement along the latter shaft, said driving clutch means being movable to a first position of driving engagement with said driven clutch means wherein said driven member is driven in one direction of rotation from said driven clutch means by axial movement of said driven shaft from said centered position to one limited position and then back to said centered position and said driving clutch means being movable to a second position of driving engagement with said driven clutch means wherein said driven member is driven in the opposite direction of rotation from said driven clutch means by axial movement of said driven shaft from said centered position to the other limiting position and back to said centered position, a coupling between said driving shaft and driven shaft which drivably couples said shafts for rotation of said driven shaft by said driving shaft when said driven shaft is restrained against axial movement and which restrainably reciprocates said driven shaft from said centered position to said limiting positions in alternate sequence when said driven shaft is released for free axial movement, and means for restraining said driven shaft in said centered position during rotation of said driven member through a given arc and releasing said driven member for movement to one limiting position and back to said centered position at one end of said arc and for movement to the other limiting position and back to said centered position at the other end of said arc, whereby to cause said driven member to oscillate through said arc.

9. The subject matter of claim 8 wherein said driven shaft restraining means comprises two axially spaced, coaxial cylindrical cams, a cam follower between and engaging both cams, means connecting said driven member and cam follower for rotation of the latter by said driven member and along said cams, and a connection between said cam follower and driven shaft whereby the latter is restrained against axial movement in its centered position when said cam follower engages both cams, each cam having a relief for receiving said cam follower to permit movement of said driven shaft to said positions, respectively.

10. The subject matter of claim 9 including means to relatively angularly adjust said cams to vary the angular spacing between said reliefs, whereby to vary the arc of oscillation of said driven member.

11. The subject matter of claim 8 wherein said coupling comprises a cylindrical cam drivably coupled to said driving shaft for rotation with the latter and having a circular cam track centered on and disposed in a plane inclined to said axis, and a cam follower coupled to said driven shaft for rotating and axially moving the latter, said cam follower engaging in said cam track and causing said reciprocation of said driven shaft upon the rotation of said cam with respect to said cam follower which occurs when said driven shaft is released for axial movement due to frictional retention of said driven shaft against rotation.

12. A reversing clutch mechanism comprising a driven member, an axially movable driven shaft, a reversible rotary driven clutch means connected to said driven member for rotation of the latter by said driven clutch means, rotary driving clutch means mounted on said shaft for axial movement with the latter between a first position of driving engagement with said driven clutch means wherein said driven member is driven in one direction of rotation and a second position of driving engagement with said driven clutch means wherein said driven member is driven in the opposite direction of rotation, a rotatable shaft, a cam drivably coupled to one shaft for rotation with the latter on the axis of said driven shaft and having a circular cam track centered on and disposed in a plane inclined to said axis, and a cam follower coupled to the other shaft for rotation with the latter, said cam and cam follower imparting axial reciprocation to said driven shaft during relative rotation of said cam and cam follower to alternately shift said driving clutch means between said positions.

13. The subject matter of claim 12 wherein said driven shaft is rotatable and said rotatable shaft is a continuously rotating shaft, whereby said driven shaft tends to reciprocate continuously, and means for releasably restraining said driven shaft against rotation, said cam and cam follower forming a rigid coupling between said shafts when said driven shaft is restrained against reciprocation.

References Cited in the file of this patent

UNITED STATES PATENTS

| | | |
|---|---|---|
| 886,667 | Wigglesworth | May 5, 1903 |
| 1,024,595 | Noyes | Apr. 30, 1912 |
| 2,874,584 | Ahlport | Feb. 24, 1959 |